United States Patent
Pearson

(10) Patent No.: US 9,794,618 B2
(45) Date of Patent: Oct. 17, 2017

(54) MEDIA CONTENT PLAYBACK SYSTEM AND METHOD

(71) Applicant: Harman International Industries, Incorporated, Stamford, CT (US)

(72) Inventor: Levi Pearson, Lehi, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 59 days.

(21) Appl. No.: 14/620,709

(22) Filed: Feb. 12, 2015

(65) Prior Publication Data

US 2016/0241907 A1     Aug. 18, 2016

(51) Int. Cl.
| | |
|---|---|
| H04N 21/475 | (2011.01) |
| H04N 21/436 | (2011.01) |
| H04N 21/472 | (2011.01) |
| H04L 29/08 | (2006.01) |
| G11B 27/11 | (2006.01) |
| H04L 12/28 | (2006.01) |
| H04N 21/442 | (2011.01) |

(Continued)

(52) U.S. Cl.
CPC ....... *H04N 21/43615* (2013.01); *G11B 27/11* (2013.01); *H04L 12/2805* (2013.01); *H04L 12/6418* (2013.01); *H04L 67/148* (2013.01); *H04L 67/16* (2013.01); *H04N 21/44227* (2013.01); *H04N 21/47217* (2013.01); *H04N 21/6581* (2013.01); *H04W 36/0005* (2013.01); *H04W 36/0011* (2013.01)

(58) Field of Classification Search
None
See application file for complete search history.

(56) References Cited

U.S. PATENT DOCUMENTS

| | | |
|---|---|---|
| 7,941,131 B2 | 5/2011 | Malik |
| 7,996,482 B1 | 8/2011 | Evans et al. |

(Continued)

FOREIGN PATENT DOCUMENTS

| | | |
|---|---|---|
| WO | 2005013047 A2 | 2/2005 |
| WO | 2006134524 A1 | 12/2006 |
| WO | 2008065604 A1 | 6/2008 |

OTHER PUBLICATIONS

Extended European Search Report from related European Application No. 16155013.2 dated Jun. 20, 2016, 10 pp.

(Continued)

*Primary Examiner* — Pankaj Kumar
*Assistant Examiner* — Charles N Hicks
(74) *Attorney, Agent, or Firm* — Brooks Kushman, P.C.

(57) ABSTRACT

An apparatus for switching media content playback from a first playback device to a second playback device across a plurality of playback devices may include a controller programmed to detect a change in location of a portable device from a first media zone including a first playback device to a second media zone including a second playback device, determining a playback position of currently played media content provided from a first media source to the first playback device, identify a second media source that is available at the second media zone, and control the second media source to transmit the currently played media content to the second playback device to switch playback from the first playback device to the second playback device at the playback position.

12 Claims, 11 Drawing Sheets

(51) Int. Cl.
*H04N 21/658* (2011.01)
*H04W 36/00* (2009.01)
*H04L 12/64* (2006.01)

(56) References Cited

U.S. PATENT DOCUMENTS

| | | | |
|---|---|---|---|
| 8,176,193 | B2 | 5/2012 | Baldwin |
| 8,631,508 | B2 | 1/2014 | Woods |
| 9,137,091 | B2 | 9/2015 | Lockerbie et al. |
| 9,137,559 | B2 | 9/2015 | Sofos et al. |
| 9,537,852 | B2 | 1/2017 | Beckhardt et al. |
| 2003/0023427 | A1 | 1/2003 | Cassin et al. |
| 2005/0057538 | A1 | 3/2005 | Morse et al. |
| 2006/0161872 | A1 | 7/2006 | Rytivaara et al. |
| 2006/0259758 | A1 | 11/2006 | Deng et al. |
| 2006/0259781 | A1 | 11/2006 | Saeki et al. |
| 2009/0077673 | A1 | 3/2009 | Schmelzer |
| 2009/0125571 | A1 | 5/2009 | Kiilerich et al. |
| 2009/0171487 | A1 | 7/2009 | Wilhelm |
| 2009/0232481 | A1 | 9/2009 | Baalbergen et al. |
| 2009/0307258 | A1 | 12/2009 | Priyadarshi et al. |
| 2010/0027966 | A1* | 2/2010 | Harrang .............. H04N 5/775 386/241 |
| 2010/0042235 | A1 | 2/2010 | Basso et al. |
| 2010/0293264 | A1 | 11/2010 | Ramsay |
| 2011/0013501 | A1 | 1/2011 | Curtis |
| 2011/0015985 | A1 | 1/2011 | Curtis |
| 2011/0113037 | A1 | 5/2011 | Wessling et al. |
| 2011/0216640 | A1 | 9/2011 | Curtis |
| 2012/0051668 | A1 | 3/2012 | Martin et al. |
| 2012/0060100 | A1 | 3/2012 | Sherwood et al. |
| 2012/0114302 | A1 | 5/2012 | Randall |
| 2012/0271823 | A1 | 10/2012 | Asikainen et al. |
| 2012/0284757 | A1 | 11/2012 | Rajapakse |
| 2013/0014155 | A1 | 1/2013 | Clarke et al. |
| 2013/0060841 | A1 | 3/2013 | Knight et al. |
| 2013/0219423 | A1 | 8/2013 | Prickett et al. |
| 2013/0317635 | A1 | 11/2013 | Bates et al. |
| 2014/0115114 | A1* | 4/2014 | Garmark .............. H04L 65/60 709/219 |
| 2014/0181202 | A1 | 6/2014 | Gossain |
| 2014/0229395 | A1 | 8/2014 | Singer et al. |
| 2014/0258464 | A1 | 9/2014 | McCoy et al. |
| 2014/0337310 | A1 | 11/2014 | Ong et al. |
| 2015/0092947 | A1 | 4/2015 | Gossain et al. |
| 2015/0094834 | A1 | 4/2015 | Vega et al. |
| 2015/0128194 | A1* | 5/2015 | Kuang ............. H04N 21/41407 725/81 |
| 2015/0179227 | A1 | 6/2015 | Russell |
| 2015/0193198 | A1 | 7/2015 | Hutchings et al. |
| 2015/0245138 | A1 | 8/2015 | Bender et al. |
| 2015/0278322 | A1 | 10/2015 | Beckhardt |
| 2016/0070888 | A1 | 3/2016 | Gorman et al. |
| 2016/0088036 | A1 | 3/2016 | Corbin et al. |
| 2016/0182952 | A1 | 6/2016 | Wu et al. |
| 2016/0239508 | A1 | 8/2016 | Pearson |
| 2016/0241976 | A1 | 8/2016 | Pearson |

OTHER PUBLICATIONS

Extended European Search Report from related European Application No. 16155227.8 dated Jul. 5, 2016, 9 pp.

Extended European Search Report from related European Application No. 16155382.1 dated Jul. 20, 2016, 10 pp.

\* cited by examiner

| Title | Artist | Album | Album Artist | Composer | Genre | Track No. | Disc No. | Publication Year |
|---|---|---|---|---|---|---|---|---|
| I Got You | James Brown | I Got You | James Brown | James Brown | Funk | 1 | 1 | 1962 |
| | Beats-per-minutes | Rating | Duration | Encoding Bitrate | File Size | Date Added | Date Last Played | Play Count |
| | 132 | 6 | 2:44 | 48k | 10,3359 MB | 10/25/2001 | 11/10/2014 | 29 |
| Title | Artist | Album | Album Artist | Composer | Genre | Track No. | Disc No. | Publication Year |
| Satisfaction | Rolling Stones | Out of Our Heads | Rolling Stones | Jagger and Richards | Rock | 7 | 2 | 1965 |
| | Beats-per-minutes | Rating | Duration | Encoding Bitrate | File Size | Date Added | Date Last Played | Play Count |
| | 130 | 8 | 3:42 | 48k | 12,4099 MB | 4/8/2005 | 11/10/2014 | 5 |

Figure 4

MEDIA CONTENT PLAYBACK SYSTEM AND METHOD

TECHNICAL FIELD

Aspects disclosed herein generally relate to a media content playback system.

BACKGROUND

Household speaker systems often stream audio content from a mobile device. The speaker system may occupy several zones within a dwelling (e.g., house). Speakers within these zones may receive the streamed audio content for playback. Often times, the playback on the speakers is of poor quality due to drop-outs and audio artifacts that occur as the mobile device moves around a specific zone. Moreover, streaming from the mobile device often depletes the battery power of the mobile device at a fast rate.

SUMMARY

An apparatus for switching media content playback from a first playback device to a second playback device across a plurality of playback devices may include a controller programmed to detect a change in location of a portable device from a first media zone including a first playback device to a second media zone including a second playback device, determining a playback position of currently played media content provided from a first media source to the first playback device, identify a second media source that is available at the second media zone, and control the second media source to transmit the currently played media content to the second playback device to switch playback from the first playback device to the second playback device at the playback position.

An apparatus for changing media sources that provide media content to a playback device for media playback may include a controller programmed to detect a new media source within a zone, identify the new media source as a preferred media source over a current media source, and control the new media source to provide the media content to a new playback device to switch playback of the media content from a previous playback device to the new playback device.

A non-transitory computer-readable medium tangibly embodying computer-executable instructions of a software program, the software program being executable by a processor of computing device to provide operations which may include controlling a first media source to transmit media content to a first playback device in a first zone, detecting a second zone based on a location of a portable device, determining a playback position of the media content, detecting a second media source that includes the media content based on the second zone, and controlling the second media source to transmit a copy of the media content to a second playback device within the second zone to switch playback of the media content from the first playback device to the second playback device at the playback position.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4 illustrates metadata for the unified media files in accordance to one embodiment;

DETAILED DESCRIPTION

Figure 1:
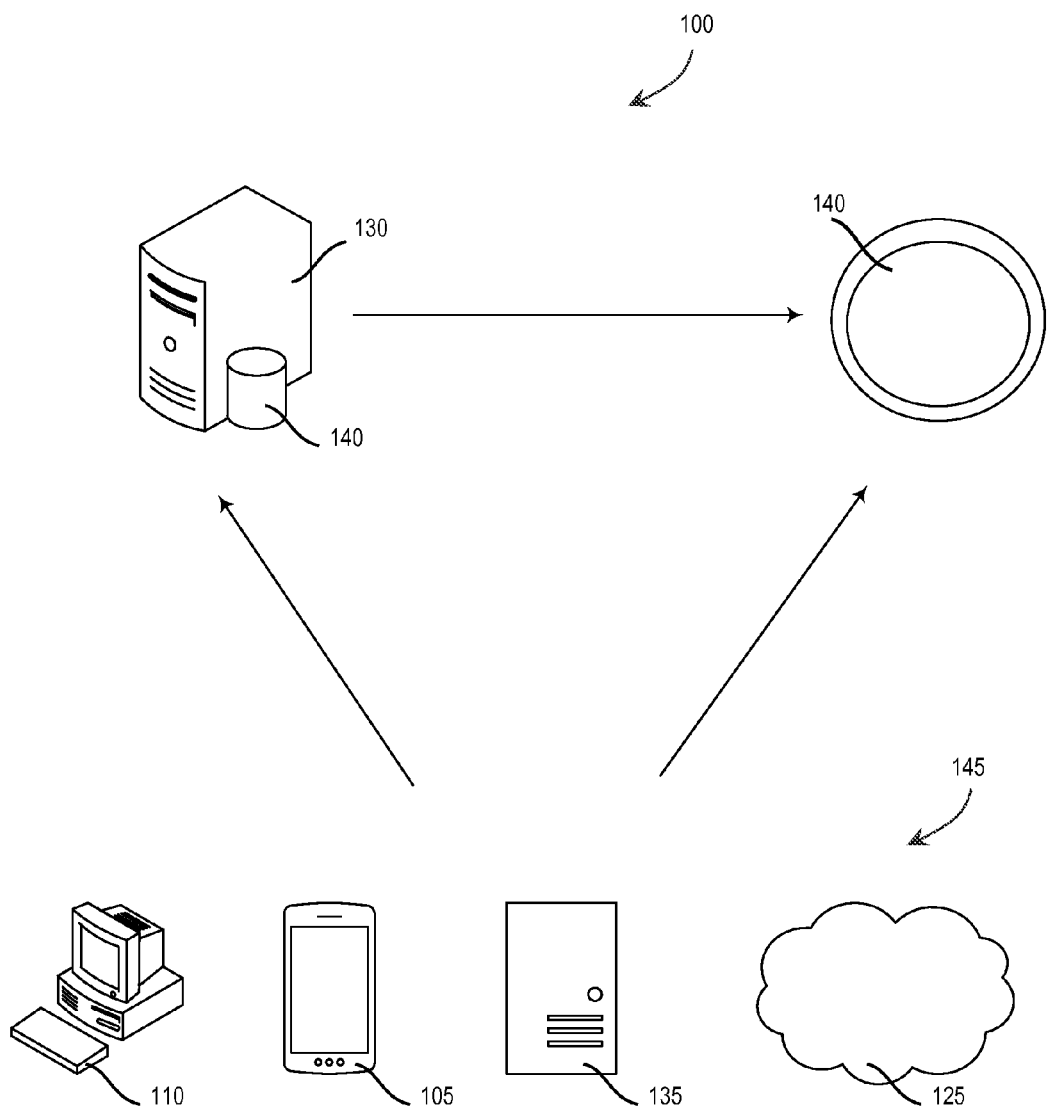
FIG. 1 illustrates a media content playback system according to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a media playback system for a dwelling, such as a house, commercial establishment, etc., having multiple zones and at least one playback devices within each zone. The playback devices may be configured to receive audio and/or video content from any number of media sources such as a mobile device, a local network database, third party servers, a cloud database, etc. The playback devices may receive the audio content from the sources via a number of transport mechanisms such as an auxiliary input/cable, Bluetooth®, WiFi™, etc. Often, media content is maintained at more than one media source. For example, a specific song could be stored both in a cloud database as well as locally on the user device. Each source may be configured to transmit audio content to the playback device via one or more transport mechanisms. For example, the user device may be configured to connect to the playback device via a Bluetooth® connection. The cloud database may be configured to communicate with the playback device over a WiFi™ network. Thus, the playback device may be capable of receiving the media content from more than one source over more than one transport mechanism. Often, receiving media content from one source is preferable when compared to receiving the content from another source. For example, when the media content is maintained in both the cloud database and the user device, it may be preferable to receive the audio content via WiFi™ from the cloud database at least because the battery of the user device may be less effected. Further, certain transport mechanisms provide for better quality of audio playback. For example, receiving the audio content via WiFi™ may provide better audio playback than Bluetooth®.

As users move between zones of a house, they may wish to continue to enjoy the same content as they move about. That is, as the user leaves one zone and enters another, it may be desirable to have the media content that was playing from the playback device in the previous zone (e.g., the room the user has left) to be played by the playback device of the new zone (e.g., the current room). Such congruent media playback may be achieved by specific hand-off protocols and methods to help facilitate an efficient and uninterrupted hand-off of media playback. In some examples, the music playing in the recently left room may gradually be faded out, while the music may begin playing at the playback device in the new room by gradually increasing the volume. Additionally, as content is played by the different playback device in different zones or rooms, the availability of the content may differ from room to room. For example, at one zone, the content may be available at both a personal computer and the user device. However, when the user leaves that room, the content may only be available at the user device in the next room. Accordingly, the system may select between which sources or device to play the media content from based on a device hierarchy. This may permit the system to save battery life of mobile device, and select a source and respective method for transporting the media content to achieve the best audio quality.

FIG. 1 illustrates a media content playback system 100 according to one embodiment. The system 100 may include a processor 130 and a playback device 140. Each of the processor 130 and playback device 140 may be in communication with one or more media sources 145. The media sources 145 may include any number of devices and storage locations configured to maintain media files such as audio and video files. Each media source 145 may be configured to provide the media files, upon request, to the playback device 140 for playback. The media sources 145 may include at least one of a user device 105, a personal computer 110, a media server 135 and a remote server 125 and are described in more detail below.

The processor 130 may be a hardware based electrical device such as a computing device that is capable of executing instructions to perform the operation noted herein. For example, the processor 130 may carry out the operations as described in connection with processes 300, 600, 800 and 1000. The processor 130 may include a controller (not shown) and may maintain the database 120, or be in communication therewith. Moreover, while the database 120 and the processor 130 are shown as separate devices from the user device 105 and personal computer 110, it is recognized that the database 120 and the processor 130 may be included in the user device 105, media server 135 and/or the personal computer 110. Additionally or alternatively, the processor 130 may be included in the playback device 140.

The processor 130 and the database 120 may also be in communication with remote server 125 and the media sources 145. Each of the media sources 145 may maintain various media files. The media files may include audio files, video files, photographs, word documents, drawings, data files, etc. In the examples herein, the media files may be described as media and audio content, but these are not intended to be limiting and are simply examples.

The user device 105 may be a personal device such as a smartphone, tablet, laptop computer, personal digital assistant (PDA), etc. The user device 105 may include a user device library. The user device library may include a plurality of media files. The personal computer 110 may also be a personal device such as a laptop computer, desktop computer, etc. The personal computer 110 may include a disk drive capable of reading and writing to compact disks. The personal computer 110 may include a computer library including a plurality of media files. The personal computer 110 and the user device 105 may each include a processor and a memory (not shown).

The media server 145 may be a dedicated server configured to maintain a user's media files. The media server 145 may be a network storage device with a large capacity for storage. The media server 145 may include an integrated media database and may provide low-power, always on, media service to a local network.

The remote server 125 may be a non-local (i.e., remote from the playback device 140) file storage location or other server configured to maintain media files. The remote server 125 may be a cloud network, and is referred to herein as "cloud 125 or cloud network 125". The remote server 125 may be configured to maintain a user's files outside of the user's devices (e.g., user device 105 and personal computer 110). The remote server 125 may also include third party media providers, such as streaming services that also provide media content. For example, the remote server 125 may include Pandora®, Netflix®, Spotify®, Amazon Prime®, YouTube®, online radio stations, webcasts, etc. These media providers may include subscription services as well as other freely accessible media content.

Using remote server 125 as source devices 145 may be advantageous in that the storage capacity is much larger than that of the user device 105, or other local sources. The files maintained by the remote server 125 may be accessed from anywhere via an Internet service, not just from home. However, there is less control over the service and bandwidth charges may be incurred if used on outside networks (e.g., cellular network). Furthermore, the quality of the data transfer from the server 125 may depend on the Internet service and wireless network.

The database 120 may be maintained in a memory and may be capable of cataloging, mapping and unifying various files, settings, metadata, etc., relating to, or stored within the devices 105, 110 and the cloud network 125. The database 120 may maintain various look-up tables to catalogue and map the media files and their locations. For example, the database 120 may include a file name and location (e.g., user device 105). This may indicate that the named media file may be found on the user device 105.

The playback device 140 may be device configured to play or present the media content, as selected by the user. The playback device 140 may be, for example, but not limited to, a speaker, headphones, television, computer monitor, screen, projector, or any combination of these.

Figure 2:
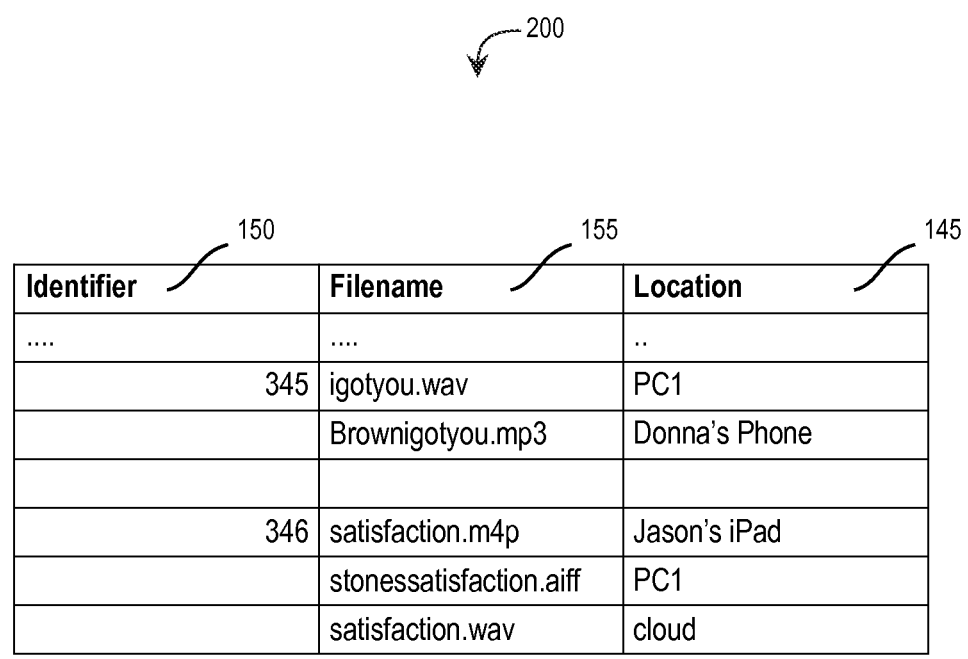
FIG. 2 illustrates a look-up table of a database of the playback system according to one embodiment.

As shown in FIG. 2, a look-up table 200 may, for example, include a file identifier 150 such as a numeric indication (e.g., #345), alpha-numeric identifier, etc. The file identifier 150 may also include an alphanumeric identifier that is descriptive of the media file. For example, the identifier 150 may include the name and artist of an audio file (e.g., "James Brown—I got you.")

The identifier 150 may be associated with at least one filename 155 and associated source 145. For example, the filename 155 may be the identifying name of the file as it is recognized by its source 145. For example, the filename 155 may be igotyou.wav and the source 145 may be the user device 105. Other additional filenames and locations may also be associated with the identifier 150. The identifier 150 may identify media content and similar media files may be grouped together under a single identifier 150. For example, if an audio file for James Brown's "I Got You" is saved locally at both the user device 105 and the personal computer 110, each of these files may be catalogued under a single identifier within the database 120. The files may be categorized and unified by various processes which will be described in more detail in connection with FIGS. 3 and 4.

Unifying and categorizing files may be advantageous when processing files across multiple sources 145. Due to limited storage space on the user device 105, and the limited connectivity between other sources, duplicates of media files are often stored, one of each file on various sources 145. These files are often stored under various names and file types, though substantially, the files would play the same media. Due to the varying naming conventions, correlation between the duplicate files may be difficult. For example, if a user 'rips' a compact disc, the media files therefrom may show up on their computer in a number of different formats, likely with some form of metadata embedded therein. Media files acquired directly from digital media distributors may likewise come in a variety of media formats and with a variety of ways for metadata to be associated with them. As users purchase multiple devices capable of directly purchasing media, the collections of media files are likely to be fragmented across multiple devices. The cloud 125 may aid with some level of synchronization between the devices, but may only do so if the media content is purchased from the same source.

Figure 3:
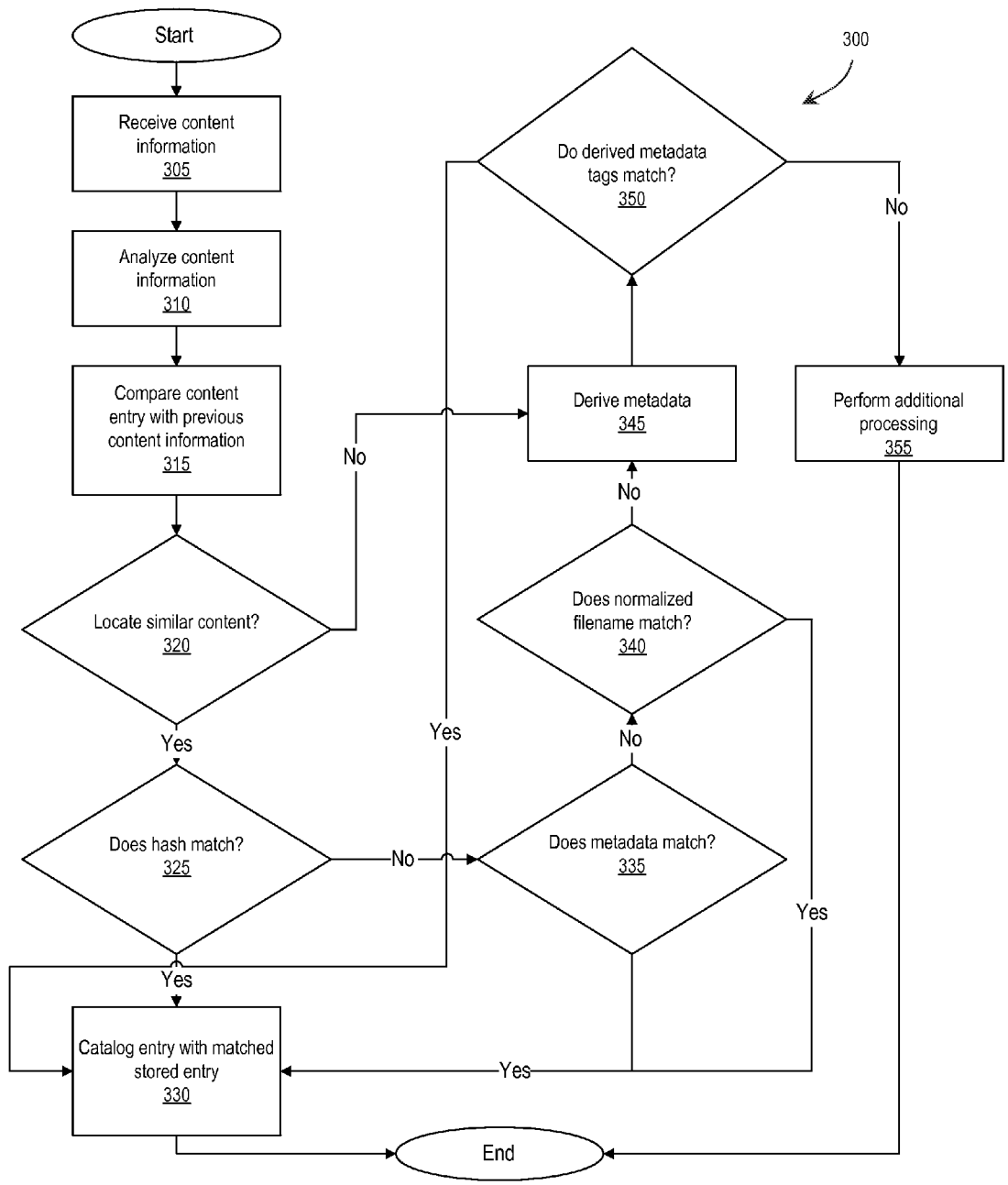
FIG. 3 illustrates a method for the unifying media files for the playback system in accordance to one embodiment.

FIG. 3 illustrates a process 300 for unifying the various media files from the various media sources 145 in accordance to one embodiment. The process 300 may be carried out by the processor 130.

At block 305, the processor 130 may receive content information from the various media sources 145 (e.g., the user device 105, the personal computer 110, the cloud 125, etc.) The content information may include data indicative of a media file and the location thereof. For example, the processor 130 may receive content information from the user device 105. This content information may include a list of files located locally within the user device 105. These files may be identified by their file names including the file storage path and extension. The content information may also include a unique identifier for each source 145, the file size (in bytes), the file format (as determined by the filename extension as well as being confirmed by identifying features within the file), a hash (such as the md5 sum) of the file contents, and all metadata stored within the file, if available.

The processor 130 may also receive a list of files from the personal computer 110 and the remote server 125. Initially, the processor 130 may receive a list or group of files located within a specific source 145 (e.g., the list of files within the user device 105). This may occur at an initial set-up or upon recognizing a new source. However, after the initial list of files has been received, it may be duplicative to routinely send a large list of files. Thus, the content information may only include the files that have changed (either been deleted on the device or added) since the last content information was received. This updated content information may be done as a periodic update at predefined intervals, as a device enters the dwelling or zone, or as necessary (e.g., a new song was downloaded or a predefined amount of time has lapsed since content information was received.)

At block 310, the processor 130 may analyze and parse the content information. That is, the processor 130 may create a content entry for each file identified within the content information. For example, a content entry may include the file name, as well as other file specific characteristics for that file such as the size, metadata, etc.

At block 315, the processor 130 may compare each content entry derived from the content information with content information previously stored in the database 120 to conduct an initial matching. The previously stored content information may include previously received information including various content entries, similar to the content shown in FIG. 2. For example, if the content entry is for a file titled "satisfaction.wav" and if the content entry includes certain properties and characteristics such as size, file name, file type, etc., then the content entry will be compared with previously stored content in an effort to match the content entry with other like content.

At block 320, the processor 130 may determine whether the content entry is similar to a previously stored content entry. This determination may be made using any number of comparison techniques. For example, the processor 130 may find an exact or near exact match to the entry's filename. The processor 130 may also determine that the content entry is similar to a stored entry by comparing the file size, type, etc. This initial matching may be performed to catch any exact, or near exact, matches with the stored data. More detailed analysis of the received content and entries therein may be performed, as will be explained below in connection with blocks 330-355. By reviewing the content entry for an initial match, longer processing may be alleviated.

If the content entry is similar to at least one stored entry, then the process 300 proceeds to block 325. If not, then the process 300 proceeds to block 345.

At block 325, the processor 130 may determine whether the hash of the content entry matches. That is, if the hash value of the content entry matches the hash value of the matched stored entry, then the process 300 may proceed to block 330. If the hash values do not match, then the process 300 may proceed to block 335.

At block 330, the processor 130 may catalogue the content entry according to the matched entry. That is, the processor 130 may group the content entry with the matched entry, similar to the groupings under the identifiers 150, as shown in FIG. 2. Thus, the content entry of the media file may be catalogued with similar media files. The look-up table 200 may show the filename and location.

At block 335, the processor 130, in response to the hash values not matching, may determine whether the metadata of the content entry matches any metadata of the stored entries. This metadata may include the artist, song, performance name, etc. The matches of the metadata may be exact, or near exact matches. For example, metadata having the artist as "James Brown" may match stored metadata of "James J. Brown" However, "James Brown" may not be considered a match for meta data having an artist "Jim Brown."

If the processor 130 determines that the metadata of the content entry matches that of a stored entry, then the process 300 proceeds to block 330. If not, then the process 300 proceeds to block 340.

At block 340, the processor 130 may take the normalized names of the files and determine whether the file names of the entries are similar. For example, the processor 130 may remove the file extensions, spaces, punctuation, capitalization and other articles and determine whether the file names of the content entry matches other normalized stored names. In one example, where a filename may be "igotyou.mp3," and another filename may be "i_got_you_2.wav", each may be normalized to "igotyou." If the normalized filenames match, then the process 300 proceeds to block 330. If not, then the process 300 proceeds to block 345.

At block 345, the processor 130 may derive metadata from secondary information within the content entry. In one example, the processor 130 may break the filename of the entry into groups of words based on common delimiters such as spaces, dashes, slashes, underscore, periods, capitalization changes, numbers, etc. The same may be done for each of the first three directory names. For example, it is common for music ripping programs to store ripped music in directory structures named after artists and albums, e.g., /music/James Brown/I Got You (I Feel Good)/01. I Got You (I Feel Good).mp3. In this case, it would check "James Brown" and "I Got You (I Feel Good)" against known artists and albums.

Once the metadata is derived, a separate metadata database or table may be generated based on the metadata tags of each content entry. That is, each entry may have a list of metadata tags associated with it. These tags may be used to match otherwise unmatched content entries. These tags may be extracted during the initial intake of the content entry at block 310. The metadata tags for the previously stored tags may be stored in the separate metadata database, or along with the catalogue of entries.

At block 350, the processor 130 may determine whether similarly stored metadata tags match the derived metadata of the content entry. That is, the processor 130 may determine whether the stored metadata tags match to the derived tags. If the derived metadata matches any stored metadata, then the process 300 proceeds to block 350. If not, then the process 300 proceeds to block 355.

At block 355, the processor 130 may perform additional processing of the content entry. This processing is described in more detail in connection with FIG. 4. The process 300 may then end.

Accordingly, the process 300 may provide for a tiered matching system that is both accurate and efficient.

In addition to synchronizing the media content/files, the processor 130 may also implement storage management systems for maintaining the media files. For example, an adaptive media caching system may be safely stored and backed up automatically on a network device (e.g., personal computer 130 or the cloud 125). Frequently played media content may be pushed to these locations, or any location where they tend to played, which may allow for easy and high quality playback. Furthermore, any media content that plays to a device over a transport that provides full fidelity of the media content (such as WiFi™, streaming or wired network streaming) may be stored in short-term cache that may follow a least-recently-used policy for cache eviction. If the system 100 decides that the media content it is played from a device frequently enough, then the processor 130 may promote the content from short-term cache to the primary source for the media.

The storage management systems may also include a tracking playback system. The tracking playback system may make use of a limited storage space on the sources by keeping track of the playback counts for individual media performances. For example, frequently played files may be distributed to more devices, while infrequently played ones may be dropped from the devices with limited storage capacity. The system may also keep track of where the media performance is played. If a widely distributed file is not often played at a certain playback device 140, then the file may be dropped from the device 140.

FIG. 4 illustrates metadata for various content entries in accordance to one embodiment. For example, the metadata may include a song title, artist, album information such as the album name, album artist and composer. The metadata may also include certain media characteristics such as the genre, beats-per-minute, runtime or duration, etc. Although not illustrated, other media characteristics may be included in the metadata such as tempo, spectral flatness, and other characteristics indicative of the song's characteristics. These characteristics may make up an "audio fingerprint" for the song and may be used to match the file with like-stored files.

Figure 5:
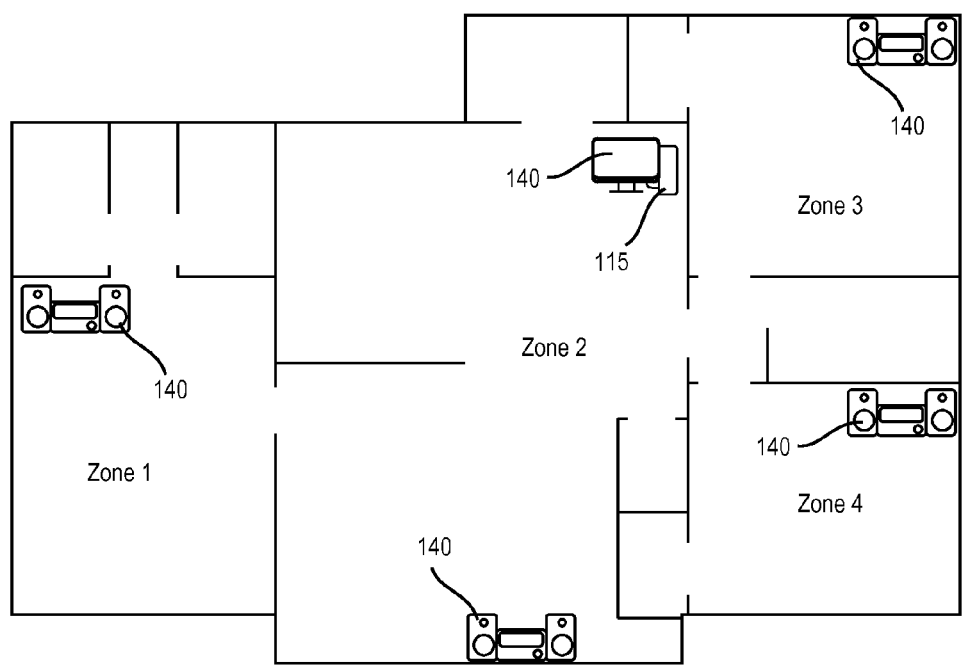
FIG. 5 illustrates a blueprint for various zones of the playback system in accordance to one embodiment.

FIG. 5 illustrates a blueprint for a dwelling 500 having several zones, as labeled "zone 1," "zone 2," "zone 3," and "zone 4." At least one playback device 140 may be arranged in each zone. As explained, the playback devices 140 may be speakers or televisions configured to play the media content. The playback devices 140 may be integrated into other systems such as a speaker system, or the user device 105 and the personal computer 110. The speaker system may include speakers and a device configured to maintain or play audio either from memory or a memory device such as a compact disk, USB, floppy drive, etc.

A list of zones may be maintained in the database 120. A list of playback devices 140 may be associated with each zone. A list of media sources 145 (e.g., the user device 105, the personal computer 110 and the remote server 125) may also be maintained in the database 120 for each zone. The lists may be updated periodically or whenever a new user device 105 and/or personal computer 110 are detected. For example, if the user walks into a room with his or her user device 105, then the content sources 145 associated with that zone may be updated to include the user device 105. Likewise, when the user device 105 leaves the zone, the database 120 is also updated accordingly. Because the database 120 maintains a list of content at each source 145 (e.g., the media content at each device such as the user device 105, the personal computer 110, cloud 125, among others), a list of available content within the zone may be derived.

As the user moves throughout the dwelling 500, the user may enter and leave various zones. The various playback devices 140 within the dwelling 500 may play audio and/or other media throughout the dwelling 500. These devices 140 may receive the media content from any number of sources 145 such as the user device 105, personal computer 110, cloud 125, or other device such as a compact disk player, cassette player, mp3 device, etc. Each content source may communicate with the playback device 140 via a transport. The transport may be a mechanism for transmitting data, including the media content, from the source 145 to the playback device 140. The transports may include a packet-switched digital network, a wireless network, or auxiliary network. The wireless transport may include anyone of, but not limited to, Bluetooth®, WiFi™, etc.

When the user moves in and out of the zones of the dwelling 500, the sources 145 available to provide media content, as well as the transports configured to enable transmission of the content to the playback device 140, may change. That is, the sources 145 and respective transports available in one zone may differ from those available in another. Upon entering a zone, the processor 130 may perform an analysis to determine the best selection of at least one of the content source 145 and the transport mechanism. Depending on the zone, the selected media content may be available from one, or more than one, source 145. For example, in zone 1, the song or content "Satisfaction" may only be available at the user device 105. However, in zone 2, the same content (e.g., "Satisfaction") may be available at the user device 105, as well as at the personal computer 110.

At the same time, the transports available for transmitting the content to the playback device 140 may also vary between the zones. For example, in one zone the content may be transmitted over an auxiliary input and in another zone the content may be transmitted over a wireless network.

Various transports may be advantageous over other transports for transmitting media content. For example, a standard analog wire physically connecting the source 145 to the playback device 140 may be an advantageous transport mechanism. This mechanism has the advantage of providing a high quality audio signal due to its high bandwidth capabilities. Wired communication may have low latency and may be broadcast to multiple devices simultaneously. However, because of the physical wire required to connect two devices, location constraints arise. Further, adding a wired network to an existing home may be costly and a wired mechanism also requires easily accessible wires for switching the source 145 and/or the playback device 140 within the zone. This is often inconvenient when the user device 105 is the source 145 of the content.

As noted above, other transports include wireless networks such as packet-switched digital networks, WiFi™ and Bluetooth®. While wireless networks may remove the need for a physical connection between devices and increase the flexibility of playback devices 140, these networks have fragmented media content where the convenience for the user may trump the quality of the audio signal.

Of the wireless networks, Bluetooth® may be considered one of the most convenient transport mechanisms. Often, the user devices 105 such as cellular phones and tablets may communicate with Bluetooth® enabled speakers to play media content. Bluetooth® is ubiquitous in phones, tablets, laptops, etc. Bluetooth® is also widely available in vehicles, higher-end home sound systems, speaker docking stations, etc. Enabling Bluetooth® communications between devices may be relatively easy for most users. However, Bluetooth® may often produce poor playback quality. Bluetooth® transport mechanisms also have a limited mobility range and may only successfully transfer content when two devices are close in proximity. Further, Bluetooth® is most commonly used with tablets and phones which do not have significant storage space. Bluetooth® may not be the most optimal transport mechanism for large quantity of data transfer. Moreover, Bluetooth® requires significant battery power which may deplete power on the user device 105.

WiFi™ is another common wireless transport that has widespread use. WiFi™ permits communication between two devices over relatively long ranges and has high bandwidth. Unlike Bluetooth®, WiFi™ may facilitate the transmission of high-definition video files. Further, unlike Bluetooth®, WiFi™ has little to no support for vehicles. WiFi™ also has poor peer-to-peer configuration support where most installations require a network infrastructure to be set up and a more technical pairing of devices is required (e.g., passwords, etc.).

Each of the transport mechanisms may have advantages and disadvantages for transporting media content between devices. Regardless, to achieve the best output sound from a playback device 140, the transport mechanism providing the highest-fidelity playback may be preferred.

Figure 6:
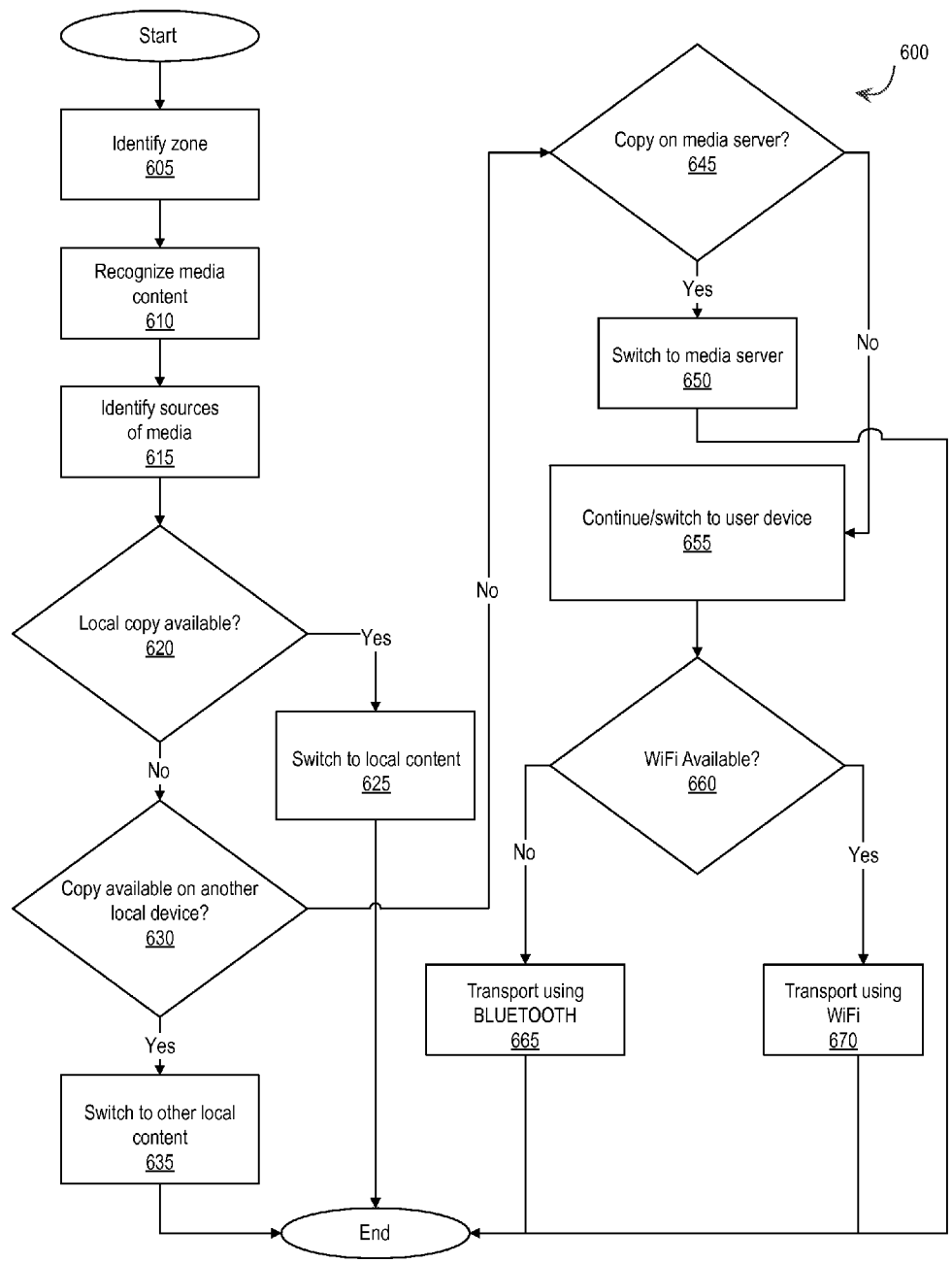
FIG. 6 illustrates a method for selecting a media source and transport mechanism for the playback system in accordance to one embodiment.

FIG. 6 illustrates a process 600 for selecting a media source 145 and transport in accordance to one embodiment. The process 600 begins at block 605, where the processor 130 recognizes the current zone. The current zone may be the zone that the user is located in, as determined by using the location of the user device 105. The location of the device may be determined by measuring radio signal strength of multiple sources, monitoring motion of handsets via internal inertial sensors, cloud-based location services, etc.

At block 610, the processor 130 may determine or recognize the current media content. The current media content may be the media content that is currently being played at a device within the zone. In one example, the current media content may be the content currently played at the user device 105 (e.g., a song). In another example, the current media content may be the content currently played at the playback device 140 and may include a movie or video. The database 120 may maintain a list of the currently played media content with respect to each zone. Additionally or alternatively, the processor 130 may communicate directly with the devices (e.g., the user device 105 or the playback device 140) playing the content to determine the current media content.

At block 615, the processor 130 may identify the media sources within the identified zone. The media sources 145 may be identified by the look up tables within the database 120. As explained, the media sources 145 may include the user device 105, the personal computer 110, the cloud 125, the playback device 140, other devices connected to the playback device 140 including a wired or WiFi™ connected device, a media server device, etc.

At block 620, once the media sources 145 have been identified, the processor 130 may determine whether a copy of the current media content is available on a local playback device 140. That is, the processor 130 may determine whether the song currently being played is also available at the playback device 140, or a device connected directly thereto. Playing media content located on the playback device 140, or a device connected thereto, may be preferred over playing media content not located on the playback device. Playing content from a local database or source 145 may provide for better playback quality. Moreover, playing local content eliminates the need to stream content from elsewhere which conserves the battery power of the user device 105. In one example, a local copy may be stored on the personal computer 110 and played through the speaker connected thereto.

If the processor 130 determines that the current content is available at the local playback device 140, then the process 600 proceeds to block 625. If not, then the process 600 proceeds to block 630.

At block 625, the processor 130 switches the current content to the local content. This may preserve battery life of the user device 105 while providing for a better audio quality.

At block 630, the processor 130 may look to other sources 145 for matching the media content since local content wasn't available. The processor 130 may order and prioritize media sources 145 as determined in block 615 according to a set of preferences. The set of preferences may include a preferred hierarchy of media sources 145. The hierarchy may indicate which types of sources 145 are preferred over others. For example, a local playback device 140 may be a preferred source over the personal computer 110 and the personal computer 110 may be preferred over the user device 105. Table 1, as illustrated directly below, provides one example of a source hierarchy list.

| 1 | Local playback device |
|---|---|
| 2 | Dedicated media server |

| | |
|---|---|
| 3 | Local playback device with cached copy |
| 4 | Personal Computer |
| 5 | Cloud |
| 6 | User device |

Thus, the processor 130 may first determine whether any dedicated servers 135 within the zone include a copy of the current content. If not, then the processor 130 may then determine whether any other local playback devices 140 include a copy, and so on. The processor 130 may proceed to block 635 once a match for the current content is found. That is, once the processor 130 locates matched content, the processor 130 may cease searching the available sources 145 and proceed to play the content from the matched local device.

Not every zone may have the same available sources 145. That is, some zones may only include one or two sources and others may include more. Regardless, the available sources 145 within the current zone may be selected from according to the hierarchy.

If no content matches are located, then the process 600 may proceed to block 645. At block 645, the processor 130 may determine whether a copy of the current content is available on a non-local source 145 such as the media server or cloud 125. If a local copy is not otherwise located in block 620, then the remote server 125 (e.g., cloud or streaming service) may provide for high quality audio, without depleting the battery life of the user device 105. If a copy is located at a non-local source 145, then the process 600 may proceed to block 650. If not, then the process 600 may proceed to block 655.

At block 650, the playback device 140 may receive the media content from the remote server 125 via WiFi™. The playback device 140 may then proceed to play the content.

At block 655, the processor 130 may select the user device 105 as the media source 145 for playing the media content. That is, because no other media sources 145 are available, the processor 130 may fall back on the user device 105 as the media source 145. The process 600 may proceed to block 660.

At block 660, the processor 130 may determine whether or not WiFi™ is available as a wireless network. The processor 130 may look up the available transport mechanisms in the database 120. The processor 130 may also detect the wireless network. If a WiFi™ network is available, then the process 600 proceeds to 665, whereby the media content is transmitted from the user device 105 to the playback device 140 via the WiFi™ network. If a WiFi™ network is not available, then the process 600 proceeds to block 675. At block 675, Bluetooth® is used as the transport mechanism to transmit the media content from the user device 105 to the playback device 140.

Figure 7:
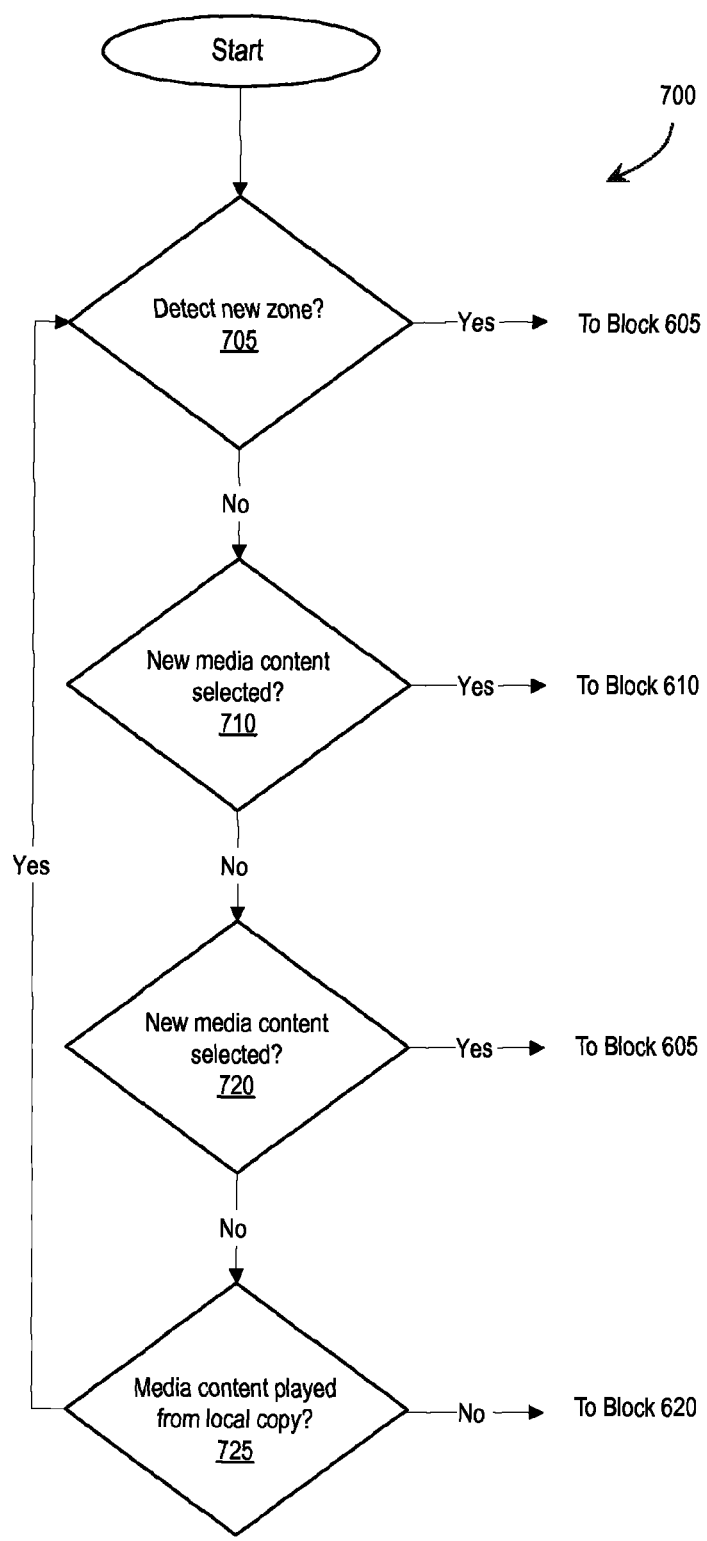
FIG. 7 illustrates a method for changing the transport mechanism and/or source during playback for the playback system in accordance to one embodiment.

FIG. 7 illustrates a process 700 for changing, or switching the transport mechanism and/or source 145 during playback in real time. The switch may be made mid-playback before the currently played content has ended (e.g., mid-song). The switch may also occur at the end of the content. In view of a trigger event, it may be desirable, or necessary, for the processor 130 to select a new source 145 or transport. Trigger events may include detecting that the user device 105 has entered a new zone, detecting that the user device 105 has left the dwelling 500, detecting a new media content selection, detecting a failure in the playback of the current content, detecting a media source 145 within the zone, detecting a new transport mechanism, etc.

Some trigger events may require a change in the transport mechanism. These events may include, but are not limited to (i) the user device 105 moving to a different zone, (ii) the user selecting a new media content that is not available at the current media source 145 or transport mechanism, (iii) the user leaving the dwelling 500 entirely, and (iv) recognizing a playback error, usually as a result of an error at the transport mechanism. Other trigger events that may not warrant a necessary transport change but may be desirable to product higher quality playback, may include but are not limited to (i) the user entering the dwelling 500 in the middle of playback at the user device 105 (e.g., moving from a vehicle and entering the dwelling 500), (ii) recognizing a new and more preferred transport (e.g., WiFi™ is detected, while the current content is being transported via Bluetooth®), and (iii) recognizing a higher priority source 145 (e.g., new content is selected and the new content is available at a local copy instead of a remote copy). The decision to change sources 145/transports may be made by the processor 130 based on user preferences stored within the database 120. These preferences may be user defined and may include default preferences.

The process 700 may start at block 705. At block 705, the processor 130 may determine whether the user device 105 has changed zones or entered the dwelling 500. If the processor 130 detects a new zone, the process 700 proceeds to block 605 of FIG. 6 where the process 700 will evaluate the media sources 145 in view of the currently played media content and determine which source 145 and transport mechanism to use. If the processor 130 does not detect a new zone, then the process 700 proceeds to block 710.

At block 710, the processor 130 may determine whether new media content has been selected for playback. If so, then the process 700 proceeds to block 610 of FIG. 6, where the media content is recognized and used to evaluate the available sources 145 and transport mechanisms. The previously selected media content may have been available only on the user device 105. However, the newly selected media content may be available on a more preferred media source 145, such as a local source 145. Thus, the processor 130 may switch to using the local source and a wired transport mechanism for playback of the selected media content.

If the processor 130 does not determine that new media content has been selected, then the process 700 proceeds to block 720. At block 720, the processor 130 may determine if a playback error has been detected. Playback errors may occur in response to several issues within the system 100. For example, the transport mechanism may become unavailable (e.g., the wireless network drops). In other examples, a streaming service becomes temporarily unavailable, etc. If a playback error occurs, then the process 700 may attempt to find another source 145 and/or transport mechanism for playback. The process 700 may proceed to block 605 of FIG. 6 to search for other available sources 145 and transport mechanism within the current zone.

If none of the trigger events in blocks 705, 710 and 720 are detected, then the process 700 may proceed to determine whether additional preferred sources 145 and transport mechanisms are available. As explained, this may be an optional change during playback based on user and default preferences as maintained by the database 120.

At block 725, the processor 130 may determine if a local copy is being used as the media source 145. If so, then the most efficient source 145 is currently being used (as well as the most efficient transport mechanism) and the process 700 proceeds to block 705 to determine if any other trigger events have been detected. If the current media source 145 is not a local device, then the process 700 proceeds to block 620 of FIG. 6 to determine if a local copy has become available. If so, then the process 700 may proceed to switching to the local copy, similar to block 625 of FIG. 6. If not, then the process 700 proceeds to block 630 of FIG. 6, and so on, to evaluate the available sources and transports.

Thus, the processor 130 may continually check for trigger events to ensure that the most efficient source 145 and transport mechanism is used to deliver the media content to the playback devices 140.

In the event that the processor 130 determines that media playback should be facilitated via a different transport, the hand-off between transports should be done efficiently and effectively to minimize disruption to the media playback. Various situations may give rise to a hand-off. In one example, a new playback device 140 may assume playing the media content where the previous playback device 140 left off. This situation arises when a user moves from one zone to another. In another example, a hand-off may arise when the source 145 changes, but the playback device 140 remains the same. This often occurs when the user remains in the same zone, but a higher priority, or more preferred or efficient source becomes available. In an effort to minimize a break in the user's listening experience, the processor 130 may optimize the available transports within a zoned area by reading ahead in the selected content (i.e., by reading ahead in the user's playlist maintained on the user device 105 or the processor 130.) The processor 130 may preemptively transfer the media files to the local storage (e.g., the playback device 140).

Figure 8:
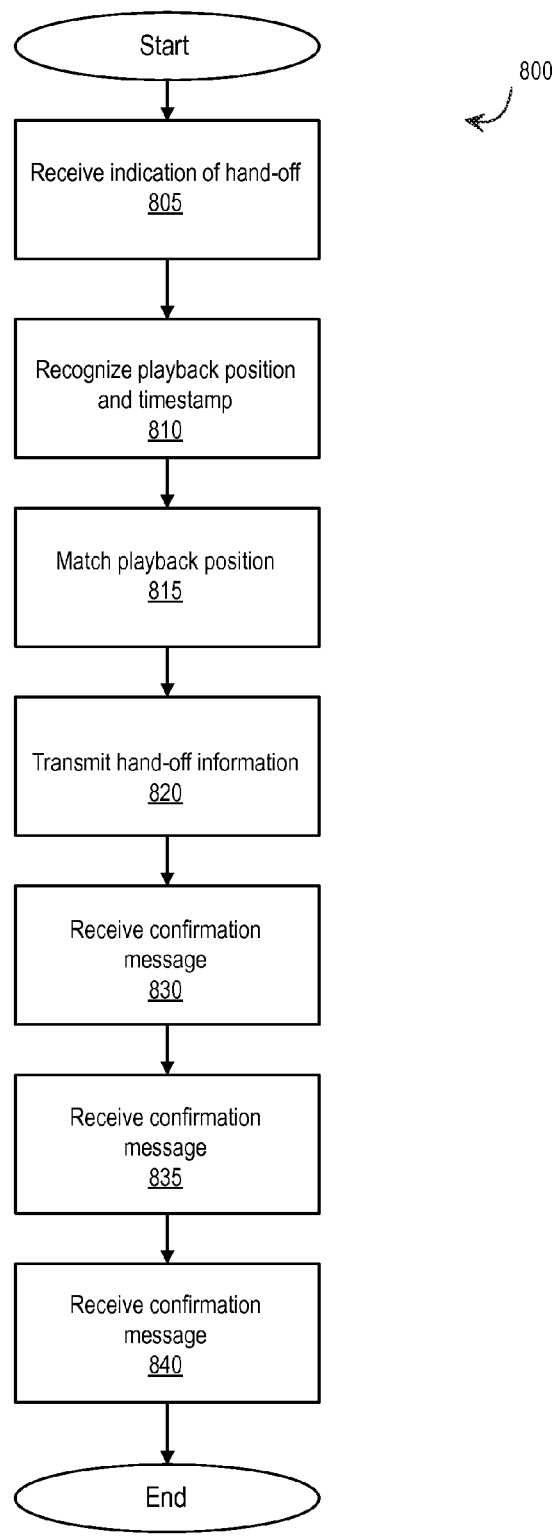
FIG. 8 illustrates a method for changing the playback device for the playback system in accordance to one embodiment.

FIG. 8 illustrates a process 800 for changing the playback device 140. As explained, this most often occurs as a user changes zones. For example, the user may move from zone 1 to zone 2 and thus the media playback should also cease in zone 1 and commence in zone 2. The previous playback device 140 and the new playback device 140 may receive the media content from the same source 145, or the sources 145 may be different.

The process 800 may begin at block 805. At block 805, the processor 130 may determine that a hand-off will occur. That is, the processor 130 may recognize a trigger event, as explained in FIG. 7, and may prepare to send and receive instructions to and from the new and previous playback device. The new playback device 140 may be selected, or recognized by the processor 130 upon determining the new zone.

At block 810, once the processor 130 determines that the hand-off operation should be performed, the processor 130 may determine the playback position of the current media content. The playback position may be the current location of the media content that is being played back. That is, the playback position refers to a playback point relative to the beginning of the song. The playback position may refer to the canonical metadata of the media content. Thus, the metadata of the current media content may be matched with the metadata of the matched media content to locate an exact, or near-exact, position within the media content. As discussed below, locating this position may be necessary to effectively switch to a new playback device 140 without interrupting the listener's experience (e.g., by picking up the playback where it was left off at the previous playback device). In addition to determining the playback position, the processor 130 may also determine the timestamp (in milliseconds) at which the playback position was determined. That is, the playback position may be coupled with a timestamp describing when the playback position was measured.

At block 815, the processor 130 may match the playback position of the current media content with that of the matched media content.

At block 820, the processor 130 may transmit hand-off information to the new playback device 140. The information may include the identifier for the media content (e.g., the filename 155), the source 145, the playback position, and timestamp.

At block 830, the processor 130 may receive a confirmation message from the playback device 140 that the new playback device 140 is ready to play the identified content. The confirmation message may indicate that the hand-off to the new playback device 140 has commenced. This may include initiating playback of the media content.

At block 835, the playback at the new playback device 140 may begin and a lower volume setting than that of the previous playback device. This may permit the hand-off to be gradual in that as the volume at the new playback device 140 increases, the volume at the previous playback device 140 decreases, until it entirely fades out. The processor 130 may instruct the previous playback device 140 to decrease the volume of the playback and instruct the new playback device 140 to increase the volume.

At block 840, the processor 130 may instruct the previous playback device 140 to cease playback of the media content. Additionally or alternatively, this may occur naturally in the example where the mobile device is connecting with the previous playback device 140 via Bluetooth® and the user device 105 moves out of range of the previous playback device.

The process 800 may then end.

In the event that the source may change when the playback devices 140 changes, specific implementations may vary depending on the type of source. For example, a hand-off method between two wired sources 145 may differ from that of two sources 145 connected via WiFi™.

In one example, if the previous media source 145 and the new media source 145 are both connected to the playback devices 140 via a wired network, then the new playback device 140 may receive the media content directly from the source 145. Once the new playback device 140 is receiving the media content, the new playback device, or processor 130, may send a confirmation to the previous playback device 140 indicating that the hand-off has been initiated. The new playback device 140 begins with a muted sound level, and gradually increases the volume while the previous playback device 140 gradually decreases its volume.

In another example, if the previous source 145 and the new source 145 are both connected to the playback devices 140 via a wireless network, e.g., WiFi™, then the new playback device 140 may request the media content, along with other media details and information such as the playback position and timestamp. The timestamp may permit the new playback device 140 to take into account any delays caused by the hand-off.

In yet another example, the previous source 145 may be the user device 105 while the new source 145 may be another type of source such as a local source. In this example, the new playback device 140 coupled to the local source may determine the appropriate playback position of the matched media content on the local source using the media information from the previous playback device.

Figure 9:
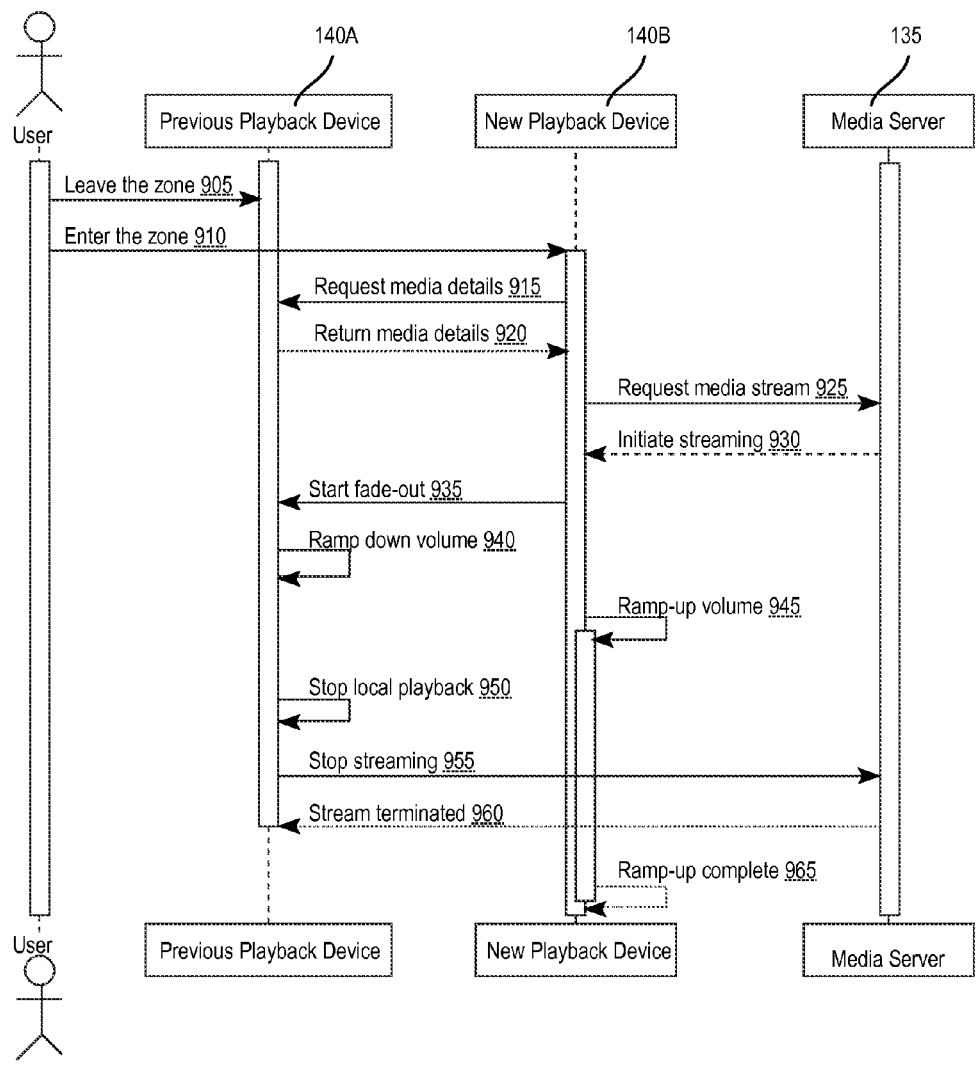
FIG. 9 illustrates a method flow for a playback device hand-off in accordance to one embodiment.

FIG. 9 illustrates a process 900 for a playback device 140 hand-off when a user moves from one zone to another at 905.

At 910, once the user enters the new zone, the processor sends instructions to the new playback device 140 (indicated by 140B). At 915, the new playback device 140 request media details (e.g., the identifier or filename, playback position, timestamp, etc.) At 920, the previous playback device 140 may transmit the hand-off information, including the media details, back to the new playback device 140. Additionally or alternatively, the processor 130 may transmit the media details to the new playback device.

Once the media details are received, at 925 the new playback device 140 may request the media content from the appropriate source 145. In this example, the source 145 is the remote server 125. At 930, the remote server 125 may initiate streaming of the media content to the new playback device 140. Once playback is initiated at the new device 140B, the previous device 140A may begin to fade-out at 935. At 940, the volume of the previous device 140A begins to gradually decrease while at 950, the volume of the new device 140B begins to gradually increase. Thus, media content may be played at both playback devices 140 while the hand-off or transition occurs.

At 955 the previous playback device 140 may instruct the remote server 125 to cease transmissions, and at 960, playback at the previous device 140A may be completely terminated. At 965, the volume at the new playback device 140 may cease increasing.

Figure 10:
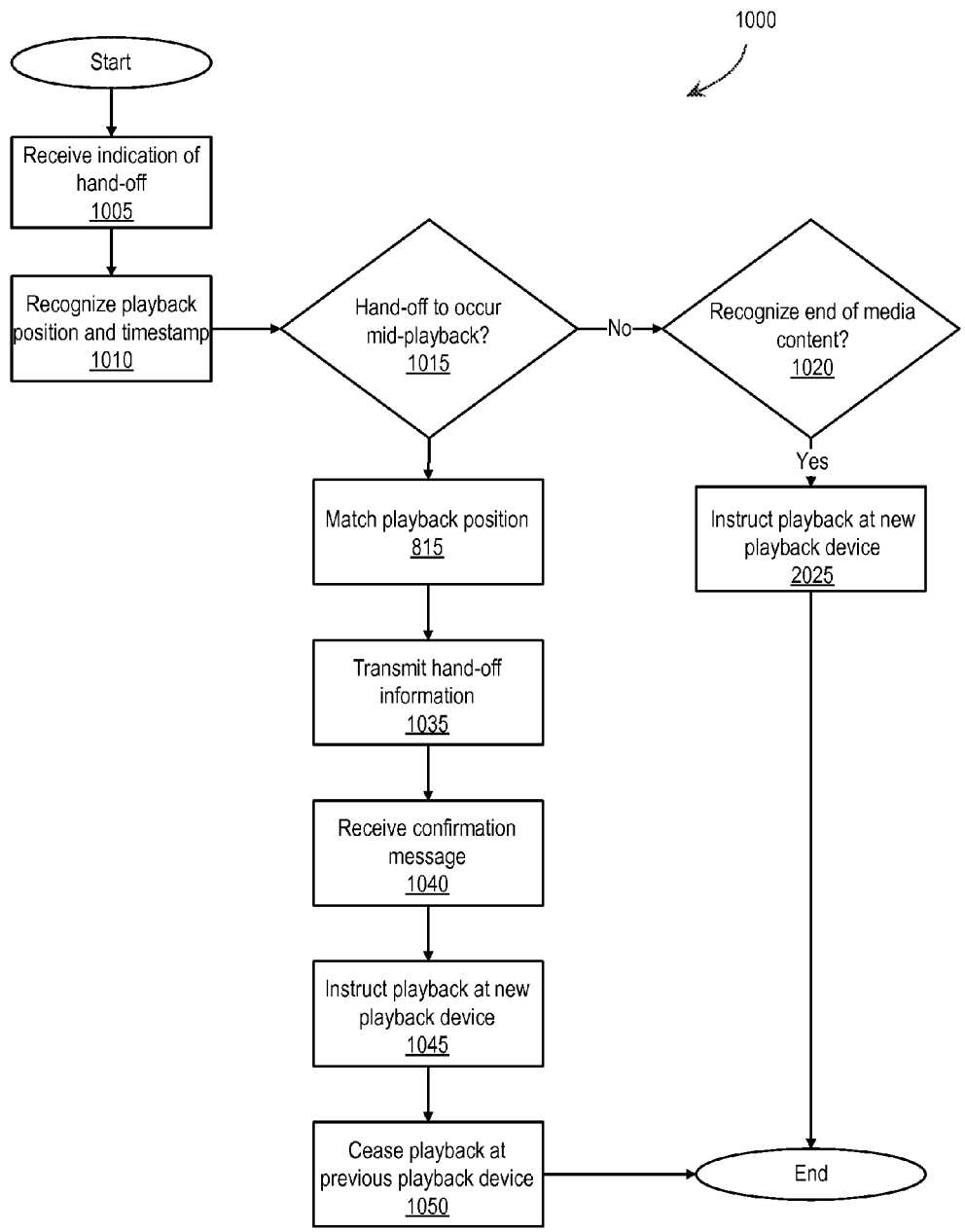
FIG. 10 illustrates a method for a media source hand-off in accordance to one embodiment.

FIG. 10 illustrates a process 1000 for a media source hand-off where the playback device 140 may not change, but the source 145 of the media content does. This may be the case when a more preferred source 145 becomes available mid-playback. The process 1000 may begin at block 1005 where the processor may determine that a hand-off is to take place. That is, the processor 130 may recognize a trigger event, as explained in FIG. 7, and may prepare to send and receive instructions to and from the new and previous playback device.

At block 1010, once a hand-off has been determined to be necessary, the processor 130 may determine the playback position of the current media content, similar to block 810 of FIG. 8.

At block 1015, the processor 130 may determine whether the hand-off to the new media source 145 is to occur mid-playback, or alternatively, after the media content is finished playing. That is, the processor 130 may determine whether to switch sources 145 during a song, or wait until the song is finished. The processor 130 may make this determination based on user settings maintained within the database 120. If the transition to the new source 145 is to occur between media contents, i.e., when the song has finished, then the process 1000 proceeds to block 1020. If the transition is to occur mid-playback, the process 1000 proceeds to block 1030.

At block 1020, the processor 130 may determine if the media content ends and then proceed to block 1025 upon such determination. At block 1025, the processor 130 may instruct the new source to transmit the media content to the playback device.

At block 1030, the processor 130 may match the playback position of the current media content with that of the match media content and proceed to instruct the new source to transmit the media content to the playback device 140 at blocks 1035-1050, similar to blocks 820-840 of FIG. 8. The process 1000 may then end.

Figure 11:
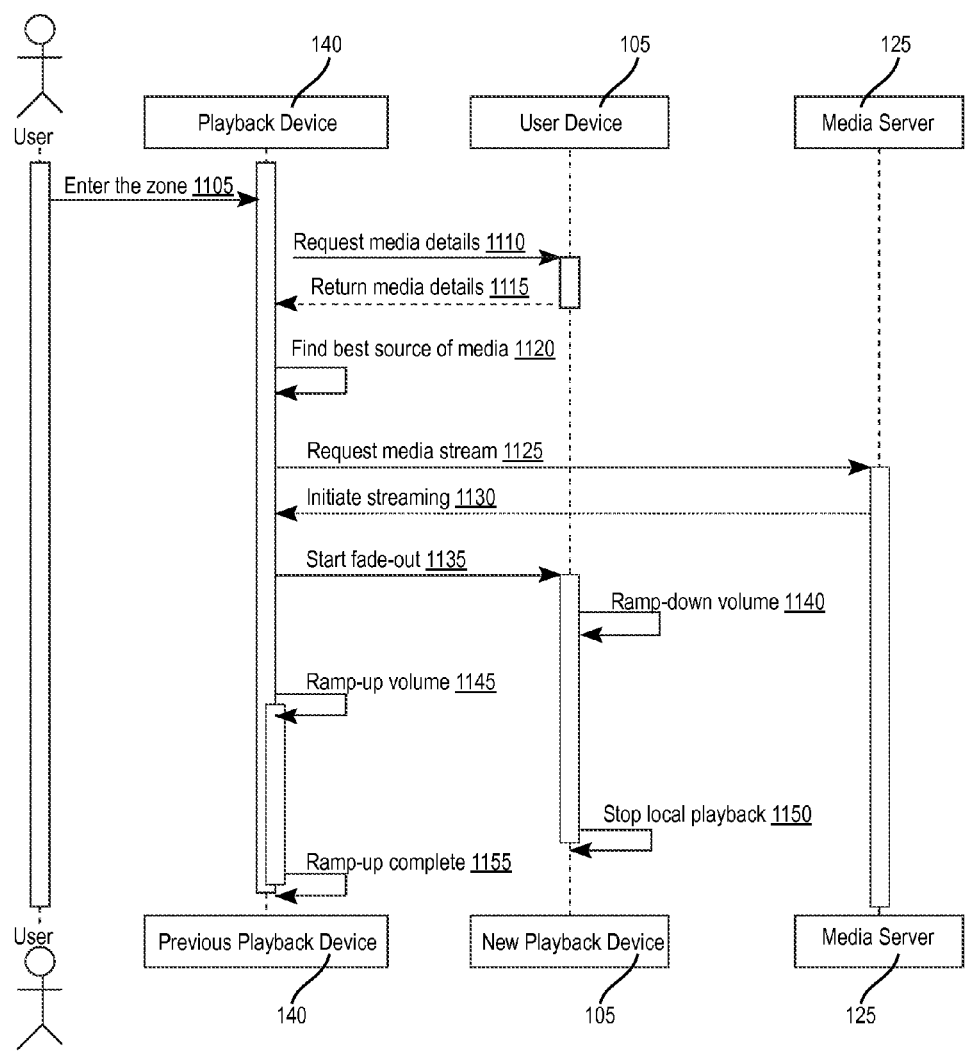
FIG. 11 illustrates a method flow for the media source hand-off in accordance to one embodiment.

FIG. 11 illustrates another method flow for a media source hand-off. In this example, the previous source 145 is the user device 105 and the new source 145 is the media server 135. At 1105, the user may enter a zone having a respective playback device 140. At 1110, upon recognizing the zone, the playback device 140 may request media details and information from the user device 105. The user device 105 may return the requested details, such as the current media content, and playback position and timestamp thereof, to the playback device 140. The playback device 140 may then search for the best media source, similar to blocks 615-645 of FIG. 6. While FIG. 11 shows that the playback device 140 may accomplish this determination, the processor 130 may be located at the playback device 140 and perform the determination. The processor 130 may also be remote and separate from the playback device and perform the determination. In this example, the media server 135 may be selected as the media source 145.

At 1125 the playback device 140 may request the media content from the appropriate source 145. In this example, the source 145 is the media server 135. At 1130, the media server 135 may initiate streaming of the media content to the playback device 140. Once playback is initiated at the playback device 140, the user device 105 may begin to fade-out at 1135. At 1040, the volume of the user device 105 begins to gradually decrease while at 1150, the volume of the playback device 140 begins to gradually increase. Thus, media content may be played at both the user device 105 and the playback device 140 while the hand-off or transition occurs.

At 1055 the playback device 140 (and/or processor 130) may instruct the user device 105 to cease local playback, and at 1155, the volume at the playback device 140 may cease increasing.

Accordingly, an efficient and accurate system for providing a hand-off between media transport mechanisms may be achieved.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An apparatus for switching media content playback across a plurality of playback devices, comprising: a first playback device in a first media zone and a second playback device in a second media zone, and a controller programmed to:
    detect a change in location of a portable device from the first media zone including the first playback device to the second media zone including the second playback device, the first playback device and second playback device being distinct from the portable device;
    determining a playback position of currently played media content provided from a first media source to the first playback device;
    identify a second media source that is available at the second media zone based at least in part on a source hierarchy and content availability; and
    control the second media source to transmit the currently played media content to the second playback device to switch playback from the first playback device to the second playback device at the playback position in response to detecting the change in location of the portable device from the first media zone to the second media zone.

2. The apparatus of claim 1, wherein the playback position includes at least one of a canonical metadata and timestamp.

3. The apparatus of claim 2, wherein the playback position indicates a time location within the currently played media content at which the change in location is detected.

4. The apparatus of claim 3, wherein the playback position indicates a time location within the currently played media content at which the second playback device is to assume playback.

5. The apparatus of claim 1, wherein the controller is further programmed to control the first media source to stop transmitting the currently played media content to the first playback device in response to an indication from the second media source that the currently played media content has been sent to the second playback device.

6. The apparatus of claim 5, wherein the controller is further programmed to control the second media source to increase a volume of the currently played media content during playback at the second playback device and to control the first media source to decrease a volume of the currently played media content at the first playback device.

7. A non-transitory computer-readable medium tangibly embodying computer-executable instructions of a software program, the software program being executable by a processor of computing device to provide operations comprising:
    controlling a first media source to transmit media content to a first playback device in a first zone,
    detecting a second zone based on a location of a portable device,
    determining a playback position of the media content,
    detecting a second media source that includes the media content based on the second zone, and
    controlling the second media source to transmit a copy of the media content to a second playback device within the second zone to switch playback of the media content from the first playback device to the second playback device, wherein switching playback of the media content is done according to a user defined setting that selects between switching playback of the media content from the first playback device to the second playback device after the media content is finished playing, and switching playback of the media content from the first playback device to the second playback device at the playback position.

8. The medium of claim 7, wherein the playback position includes at least one of a canonical metadata and timestamp.

9. The medium of claim 7, wherein the playback position indicates a time location within the media content at which the second zone is detected.

10. The medium of claim 9, wherein the playback position indicates a time location within the media content at which the second playback device playbacks the media content based on the time location.

11. The medium of claim 7, wherein the second media source is identified at least in part on a source hierarchy and content availability.

12. The medium of claim 7, further comprising controlling the first playback device to cease playback of the media content in response to an indication from the second media source that the media content has been transmitted to the second playback device.

* * * * *